United States Patent
Kadlicko

(10) Patent No.: US 7,367,257 B2
(45) Date of Patent: May 6, 2008

(54) HYDRAULIC CYLINDER WITH POSITION ENCODER

(75) Inventor: George Kadlicko, Bolton (CA)

(73) Assignee: Haldex Hydraulics Corporation, Rockford, IL (US)

( * ) Notice: Subject to any disclaimer, the term of this patent is extended or adjusted under 35 U.S.C. 154(b) by 0 days.

(21) Appl. No.: 11/205,191

(22) Filed: Aug. 17, 2005

(65) Prior Publication Data
US 2005/0274254 A1 Dec. 15, 2005

Related U.S. Application Data

(63) Continuation of application No. 10/122,140, filed on Apr. 15, 2002, now abandoned, which is a continuation of application No. 09/268,120, filed on Mar. 15, 1999, now Pat. No. 6,393,963, which is a continuation-in-part of application No. 08/965,246, filed on Nov. 6, 1997, now abandoned.

(30) Foreign Application Priority Data
Nov. 6, 1996 (GB) .................................. 9623115.4

(51) Int. Cl.
F01B 31/12 (2006.01)

(52) U.S. Cl. ...................................................... 92/5 R
(58) Field of Classification Search ...................... 91/1; 92/5 R
See application file for complete search history.

(56) References Cited

U.S. PATENT DOCUMENTS

| | | | |
|---|---|---|---|
| 3,095,785 A | 7/1963 | Cahill | |
| 3,956,973 A | 5/1976 | Pomplas | |
| 4,471,304 A * | 9/1984 | Wolf | 92/5 R |
| 4,717,874 A | 1/1988 | Ichikawa | |
| 5,012,239 A * | 4/1991 | Griebeler | 341/15 |
| 5,450,009 A | 9/1995 | Murakami | |
| 5,455,509 A | 10/1995 | Semura et al. | |
| 6,393,963 B1 | 5/2002 | Kadlicko | |

* cited by examiner

Primary Examiner—F. Daniel Lopez
(74) Attorney, Agent, or Firm—Blake, Cassels & Graydon LLP; Brett J. Slaney; John R.S. Orange

(57) ABSTRACT

An actuator has a position encoder provided by a helical groove formed in the piston rod. The groove is filled with a material of different magnetic characteristics to provide a smooth exterior surface and a varying discernible signal as the rod moves relative to the cylinder. An array of Hall effect sensors is provided around the rod to provide phase shifted signals as the rod moves so that the signal of one sensor may be correlated by the signals of other sensors.

13 Claims, 5 Drawing Sheets

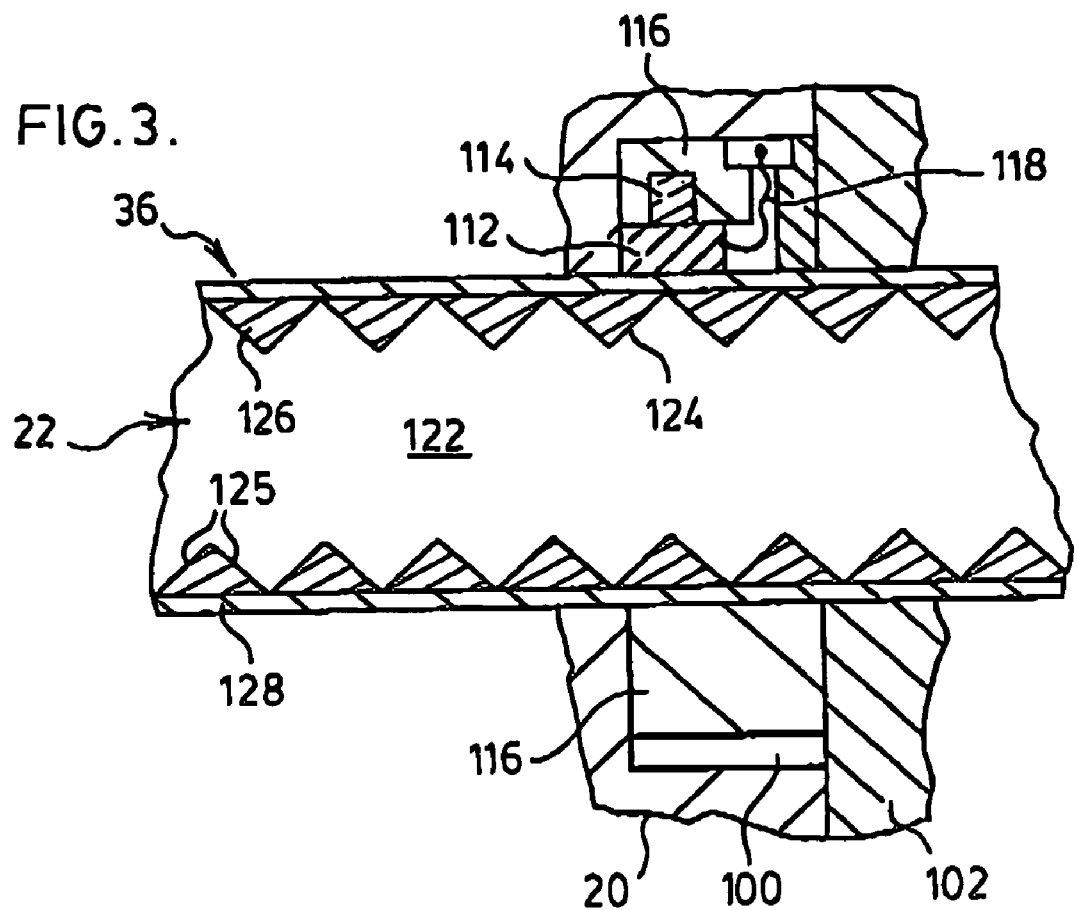
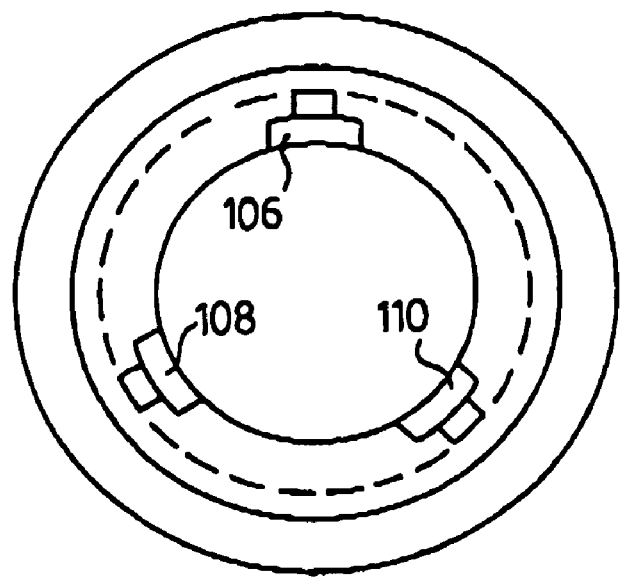

| SENSOR | A | B | C | |
|---|---|---|---|---|
| VOLTS | 5 | 3 | 3 | ← PEAK 106 |
| VOLTS | 4 | 2 | 4 | |
| VOLTS | 3 | 1 | 5 | ← PEAK 110 |
| VOLTS | 2 | 2 | 4 | |
| VOLTS | 1 | 3 | 3 | |
| VOLTS | 2 | 4 | 2 | |
| VOLTS | 3 | 5 | 1 | ← PEAK 108 |
| VOLTS | 4 | 4 | 2 | |

140

HYDRAULIC CYLINDER WITH POSITION ENCODER

This application is a continuation of U.S. application Ser. No. 10/122,140, file on Apr. 15, 2002 now abandoned, which is a continuation of U.S. application No. 09/268,120 filed on Mar. 15, 1999 now U.S. Pat. No. 6,393,963, which is a continuation-in-part of U.S. application Ser. No. 08/965,246 filed on Nov. 6, 1997 now abandoned the contents of which are incorporated herein by reference, and which claims priority from United Kingdom Application No. 9623115.4 filed on Nov. 6, 1996.

The present invention relates to actuators and more particularly to apparatus and control systems for position controlling such actuators.

The use of hydraulic cylinders to control the movement and ultimate position of components is well known. Typically such cylinders are linear, utilizing a cylinder with a piston dividing the cylinder into a pair of chambers and a piston rod attached to the piston and extending out of one or both ends of the cylinder. A control valve will then control the admission of fluid into one or other of the chambers, causing the piston to move relative to the cylinder and adjust the length of the hydraulic actuator.

In its simplest form, the control of the hydraulic cylinder is performed manually through a simple control valve. More sophisticated controls may control the movement of the cylinder in response to fluctuations in the supply pressure, flow rate of fluid or a combination thereof. Attempts have also been made to control the movement of the cylinder by monitoring the position of the movable component and providing a feedback signal to a control valve that indicates the difference between the desired location and the actual location of the component. Such arrangements rely upon the accurate measurement of the position of the piston relative to the cylinder but the measuring device must be sufficiently robust to withstand the normal harsh environment in which the actuators may be used and at the same time must maintain the structural integrity of the actuator.

U.S. Pat. No. 3,956,973 shows a hydraulic cylinder in which a series of magnetic discontinuities are provided by a square thread form cut in the wall of a cylinder rod. The discontinuities are detected by a transducer that detects the change in magnetic intensity as the thread passes the transducer. The transducers create pulsed signals which are used to provide data relating to position, velocity, and acceleration of the piston rod. The signal produced by the square thread form only identifies whether the top or base of the thread is adjacent the transducer and therefore does not give a resolution greater than the pitch of the thread. To enhance the frequency of the signal, an array of transducers is used that are distributed about a portion of the circumference of the piston rod. Whilst the frequency of the signal is increased, each transducer is only able to detect edges of the thread form and therefore the resolution is dependent on the number of transducers. Moreover, because the signal is either "high" or "low" there is an ambiguity upon reversal of the direction of movement of the rod that leads to complexity in the signal processing.

It is therefore an object of the present invention to provide an actuator in which the above needs are addressed.

In general terms, the present invention provides an actuator having a cylinder and a piston assembly moveable within the cylinder. The piston assembly projects from the cylinder and has a surface that presents to a predetermined location on the cylinder a periodically varying discernible characteristic as the surface moves relative to the cylinder. A sensor assembly monitors the discernible characteristic and measure changes therein to provide an indication of movement of the piston assembly relative to the cylinder. The varying discernible characteristic is provided by an interface on the piston assembly exhibiting a change in the discernible characteristic. The interface is inclined to the direction of travel of the rod whereby the distance between the interface and the transducer varies progressively and continuously as the piston assembly moves relative to said cylinder.

Preferably the surface of the cylinder is smooth to permit passage past a seal assembly.

In one embodiment it is preferred that the discernible characteristic is magnetic permeability and varying permeability is provided by a screw thread having convergent flanks formed in the outer surface and filled with a material of a different magnetic characteristic to present a continuous cylindrical surface to the piston assembly.

In a further embodiment, the magnetic to non-magnetic interface is provided by a tapered piston rod having a non-magnetic coating of varying thickness to provide a cylindrical outer surface.

As a further preference, a plurality of magnetic transducers are circumferentially spaced about the piston rod to enhance resolution of the movement of the piston assembly relative to the cylinder.

Embodiments of the invention will now be described by way of example only, with reference to the accompanying drawings, in which FIG. 1 is a section through a linear actuator;

FIG. 3 is a detail view of a portion of FIG. 1;

FIG. 4 is a view on the line 4-4 of FIG. 3;

Figure 1:
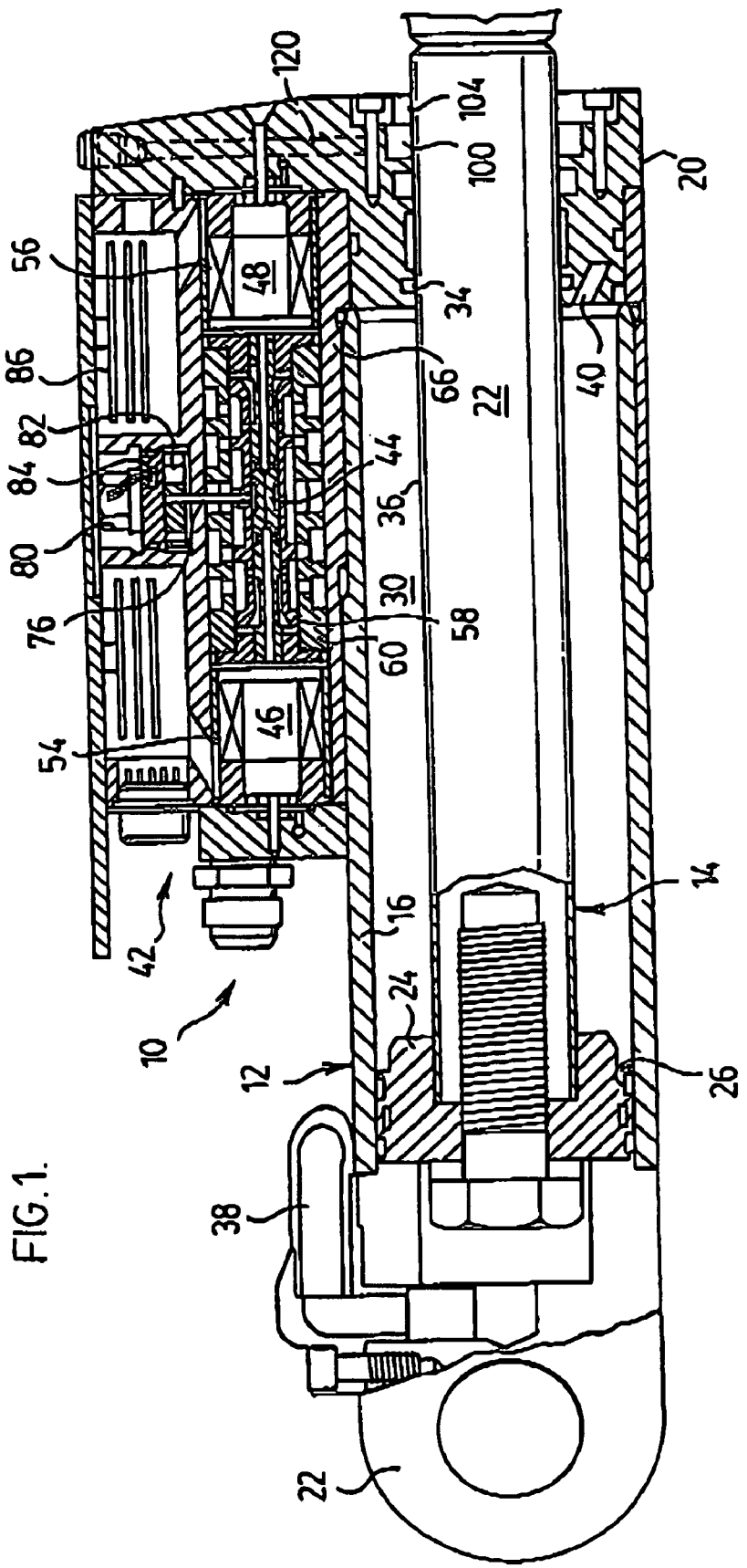

Referring therefore to FIG. 1, a linear hydraulic actuator 10 includes a cylinder assembly 12 and a piston assembly 14. The cylinder assembly 12 includes a tubular body 16 and a pair of end caps 18,20.

The piston assembly 14 includes a piston rod 22 that is connected at one end to a piston 24 that is slidably received within the tubular body 16 and includes piston seals 26 to seal against the tubular body in a conventional manner. The piston 24 thus divides the cylinder assembly 12 into a pair of chambers, namely a head end chamber 28 and a rod end chamber 30. The rod 22 projects through a bore 32 in the end cap 20 and leakage from the chamber 30 is inhibited by seal assemblies 34 that engage with the outer surface 36 of the rod 22.

Each of the end caps 18,20 includes a duct 38,40 that permits the flow of hydraulic fluid into the chambers 28,30 respectively under the control of a valve assembly 42. As shown, the valve assembly 42 is mounted on the cylinder assembly 12 but it will be understood that the valve assembly 42 may be remote from the cylinder and may be of suitable convenient form. In the embodiment shown, the valve assembly includes a primary spool 44 whose position is controlled by a pair of direct acting solenoid assemblies including coils 54,56. The details of the direct acting solenoids are more fully described in our prior application PCT/CA95/00057 and as such need not be described further at this time.

Figure 2:
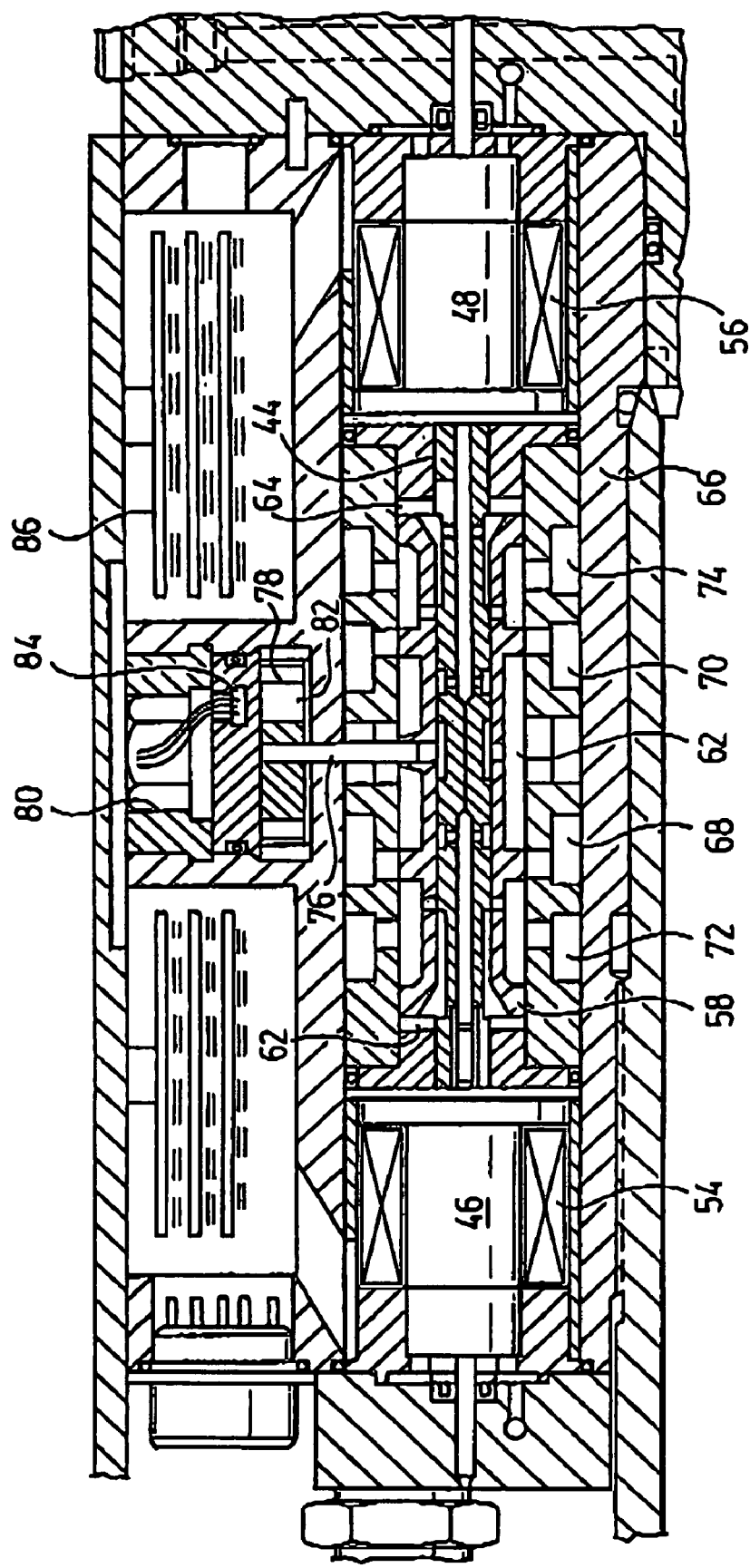
FIG. 2 is an enlarged portion of the valve shown in FIG. 1.

As best seen in FIG. 2, the primary spool 44 controls movement of a secondary spool 58 that is slidable within a ported sleeve 60. The secondary spool has a pair of pilot chambers 62,64 formed between opposite ends of the secondary spool 48 and spacers 66 that support the control spool 44. The pressure differential in the pilot chamber 62,64 causes the secondary spool to move relative to the ported sleeve 60 and allows fluid to flow from the pressure port 66 into one of the supply ports 68,70. At the same time, the other of the ports 68,70 is connected through the exhaust ports 72,74 to the sump.

Accordingly, current may be adjusted in the coils 54,56 to cause the primary spool 44 to be displaced and thus allows pressurized fluid from the port 62 to flow through the secondary spool and through cross-drillings in the primary spool to one of the pilot chambers 62,64. The other of the pilot chambers 62,64 is connected through cross-drillings in the primary and secondary spools to the exhaust ports 74. A pressure differential is thus established in the pilot chamber 62,64 causing the secondary spool to move and allow pressurized fluid to flow from the port 62 into one of the supply ports 68,70 and allow fluid to flow past the secondary spool 58 and into the exhaust port 72,74 from the other of the supply ports 68,70. Supply ducts 68,70 are connected to respective ones of the supply ducts 38,40 and thus control the flow of fluid into the chambers 28,30 causing relative movement between the piston assembly 14 and the cylinder assembly 12.

The secondary spool 58 is connected through a pin 76 to a plug 78 that is slidably mounted within a sensor assembly 80 secured in the valve 42. The plug 48 carries a magnetic insert 82 and a Hall effect sensor 84 is positioned in the sensor assembly 80 adjacent the magnetic insert 82. Movement of the secondary spool 58 relative to the ported sleeve 60 thus adjusts the relative position between the magnetic insert 82 and the Hall effect sensor 84. A varying signal is provided to a control circuit assembly indicated by the circuit boards 86 which controls the supply of current to the coils 54,56.

As can best be seen in FIGS. 1 and 3, the end cap 20 has an annular recess 100 that is closed by a plate 102 secured to the end cap 20. The plate 102 supports a wiper seal 104 that engages the outer surface of the rod 22 in a conventional manner. The recess 100, as shown in FIGS. 3 and 4, includes three uniformly spaced transducer assemblies 106,108,110, each of which is similar in construction. The transducer assembly 106 includes a Hall effect sensor 112 and a magnetic insert 114 supported on the transducer 112 in an annular collar 116. The annular ring 116 is non-magnetic, for example bronze, plastics or aluminum and is located within the annulus 100 to permit radial float relative to the end cap 20 but inhibit axial movement. The sensors 112 are connected through conductors 118 located within internal passageways 120 in the end cap 20 (FIG. 1) for connection to the circuit boards 86.

The Hall effect sensors 112 are positioned in close proximity to the surface 36 of the piston rod 22. As shown in FIG. 3, the piston rod 22 has a steel body 122 with a helical thread 124 formed on the outer surface. The thread 124 is a single start thread of relatively fine pitch is and has oppositely inclined flanks 125. The thread is filled with a material 126 of different magnetic characteristics to the body 122—for example, a copper plasma-sprayed onto the body so that a magnetic to non-magnetic interface is provided that is inclined to the longitudinal axis of the rod. A smooth cylindrical surface is provided on the body and if necessary, the body may be ground cylindrical after the application of the filler material 126. The body is then plated as indicated at 128 with a wear-resistant surface such as chromium plating so that a hardwearing cylindrical outer surface 36 is provided.

The flanks of the thread 124 provides an undulating interface that progressively and continuously vary in distance from the transducer as the rod moves relative to the cylinder. The transducer in turn provides a periodically varying discernible signal indicative of the changes in the magnetic permeability in the direction of movement of the piston rod 122, so that as the piston rod moves past the transducer assembly 106,108,110, a varying signal is obtained in the respective conductor 118. At the same time, a relatively smooth outer surface 36 is retained to maintain the integrity of the seal assemblies 34.

Figures 5, 6:
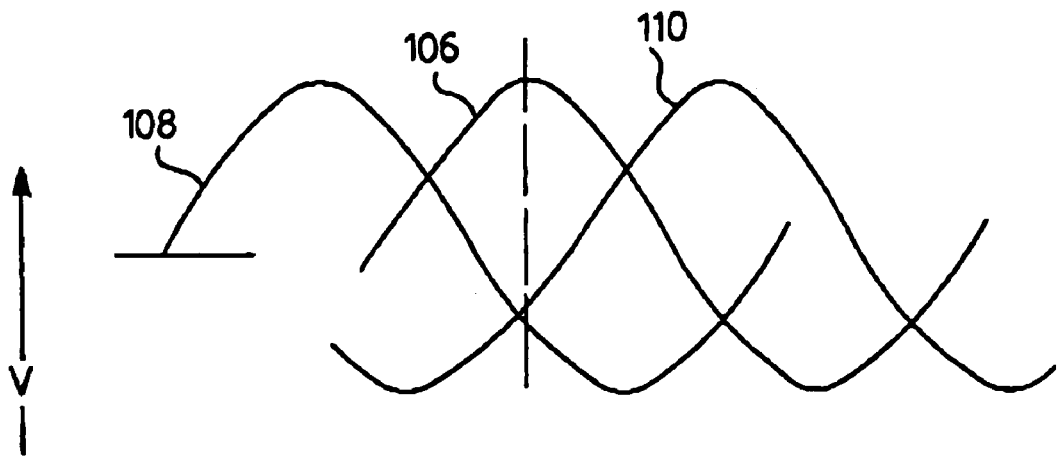
FIG. 5 is a graph showing the traces obtained from the sensing apparatus shown in FIGS. 3 and 4.
FIG. 6 is a schematic illustration of a lookup table used with the sensing apparatus of FIGS. 3 and 4.

The transducers 106,108,110 are displaced 120° from one another so that the voltage signal obtained from the Hall effect sensor 112 is phase shifted by 120° relative to the other transducers. The resultant signals are shown in FIG. 5 where it can be seen that three continuously varying voltages are obtained, each of similar form, with the peak voltage corresponding to the passage of the tip of the thread 124 past the respective transducer 106,108,110 with the minimum voltage corresponding to the root of the thread passing the transducer. Each of the transducers provides an analog signal whose instantaneous value is indicative of the position along the flank. The analog signal will vary from a maximum to a minimum value over the course of ½ pitch and so enable very high resolutions to be obtained. The voltages obtained may be digitized for use in a digital control circuit.

In its simplest form, the transducer 106,108,110 can be used to count the peaks and thereby provide an indication of the movement relative to the cylinder. Because the thread can be formed with an accurate pitch, the peak crossings can be counted and the total distance moved by the piston rod can be obtained. In this way, a very simple position transducer is obtained to provide a position signal to the control circuits 86 for control of the hydraulic valve 42.

The provision of the three transducers 106,108,110 does, however, allow an enhanced resolution as three transducers in combination with the inclined flanks 125 of the thread allows the peak crossings to be more accurately identified to enhance the accuracy of the transducer.

As may be seen in FIG. 5, with the fixed spacing of the transducers, the peak of one transducer will coincide with the position of the other two on the flanks of the threads. The peak value is difficult to identify accurately as any discrepancy in manufacturing is likely to occur at the tip or root of the thread and the rate of change of the spacing between the tip and the transducer is minimal. However, the flanks of the thread are accurately machined and the rate of change of the spacing of the interface from the transducer to vary the signal of the Hall effect sensor is at a maximum. To avoid ambiguity, the peak value is correlated with the occurrence of signals from the other two transducers of predetermined magnitude so that a pair of values from transducers 106,108 indicates the passage of the tip of the thread past the transducer 112. As shown in FIG. 6, the digitized output from each of the transducers 106,108,110 is monitored against a lookup table 140. The occurrence of predetermined values in transducers 106,108 is correlated to the peak value of transducer 110. Similarly, values at transducers 108, 110 respectively are correlated to the peak value at transducer

106 and likewise for transducer 108. In this way accurate counting and resolution of the movement of the rod may be obtained. This technique may also be used to resolve the position of transducer along a flank as three unique signals will be provided which may be cross-correlated to provide confirmation of the position of the rod. It will be appreciated therefore that the combination of enhanced peak crossing detection and the resolution along the flank by virtue of the continuously varying signal provides a position encoder with high resolution.

Figure 7:
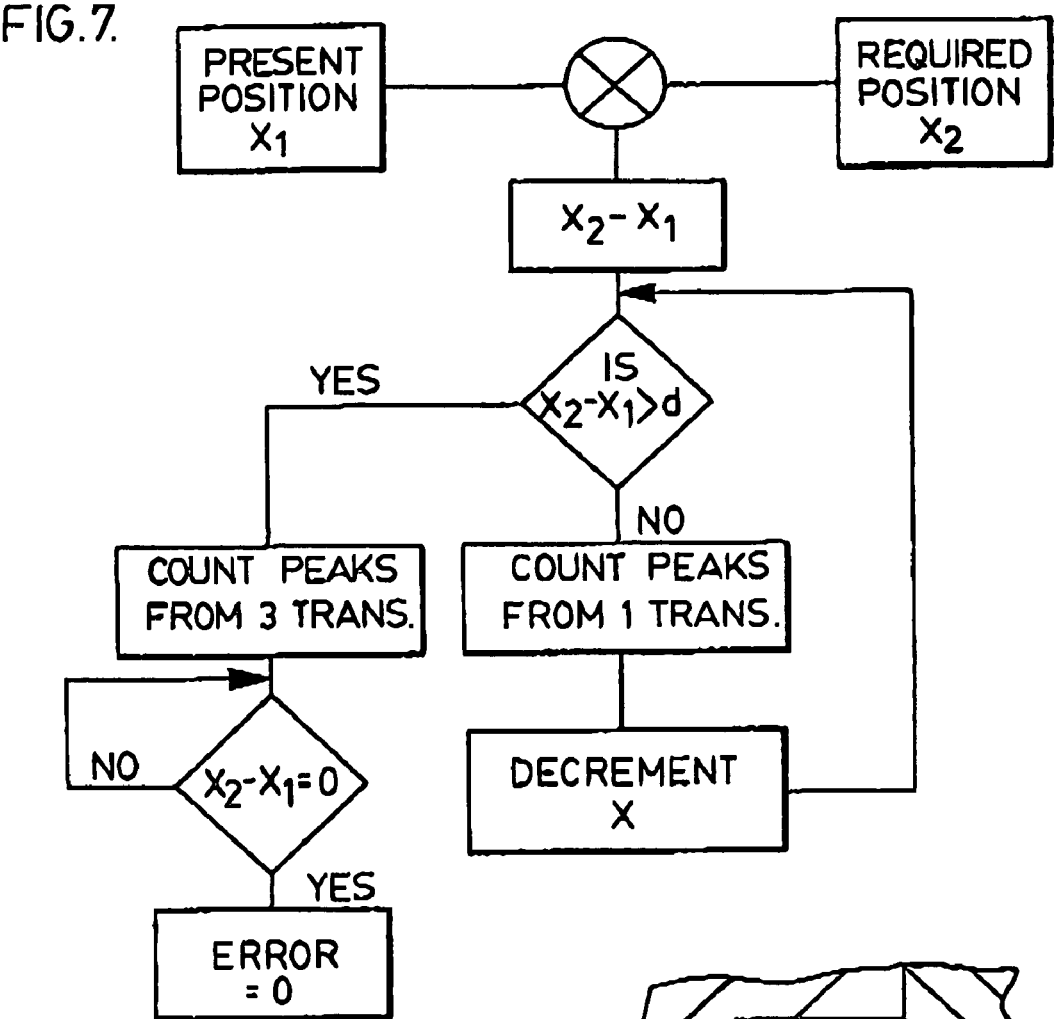
FIG. 7 is a flow chart showing a control system utilizing the transducer shown in FIGS. 3 and 4.

The cylinder 10 and associated control valve 42 may be used to implement a number of different control strategies in which a position-controlled actuator is required. The provision of 11 the multiple transducers does, however, facilitate the implementation of a control strategy that reduces the bandwidth of the transducer and at the same time provides the requisite accuracy of position control. The implementation of the strategy will be described with reference to the flow chart in FIG. 7 and the cylinder shown in FIG. 1. Assuming that the piston assembly 14 is at rest in the desired position, the solenoids 46,48 provide equal and opposite forces so that the primary spool 44 is centered. In this position, the fluid is locked in the chambers 28,30 and movement of the piston assembly 14 relative to the cylinder assembly 12 is inhibited. Upon application of a control signal to the circuits 86 from an outside controller—for example, a manual controller—indicating a new position is to be attained, a control signal is provided by the control circuit 86 to the coils 54,56 to adjust the position of the primary spool 44. Fluid is caused to flow from the pressure port 62 into the chamber 28 causing the piston 24 to move relative to the cylinder 16. The movement of the piston induces movement of the piston rod 22 past the transducers 106,108,110 but provides a position feedback signal to the control circuit 86. The control circuit 86 compares the present position with the desired position as shown by the input signal and if the difference is greater than a predetermined value d, then it continues to count the peaks provided by one of the transducers, e.g. transducer 106. Each peak is thus interpreted as the distance corresponding to a full pitch.

Continued movement of the piston 24 reduces the =or signal between the desired position and the actual position below the preset value d and causes the control circuit to monitor the peak crossings of each of the transducers 106,108. A finer resolution is thus provided and the comparison continues until the error signal is reduced to zero. The error signal between the actual position and the required position is also used to modulate the current to the coils 54,56 so that the primary spool 44 progressively moves the secondary spool back toward a neutral position. The position feedback associated with the secondary spool provides a closed loop control for the spool valve to enhance its response time.

It will be seen, therefore, that a simple position traducer is provided for a linear actuator through the provision of the varying magnetic permeability in the surface of the piston rod and that the signals obtained can be processed so as to provide a high resolution at a relatively low band width during the majority of the movement.

The inclined flanks provide a continuously varying signal that can be used to enhance the resolution of the position sensor and avoid ambiguity upon direction reversal. In this case the signal will show a reversal in the amplitude from each transducer at other than the peak value allowing the change in direction of movement to be detected. It will be understood that alternative forms of control valve may be used with the transducer and that only one transducer need be used if appropriate for the intended purpose.

Figure 8:
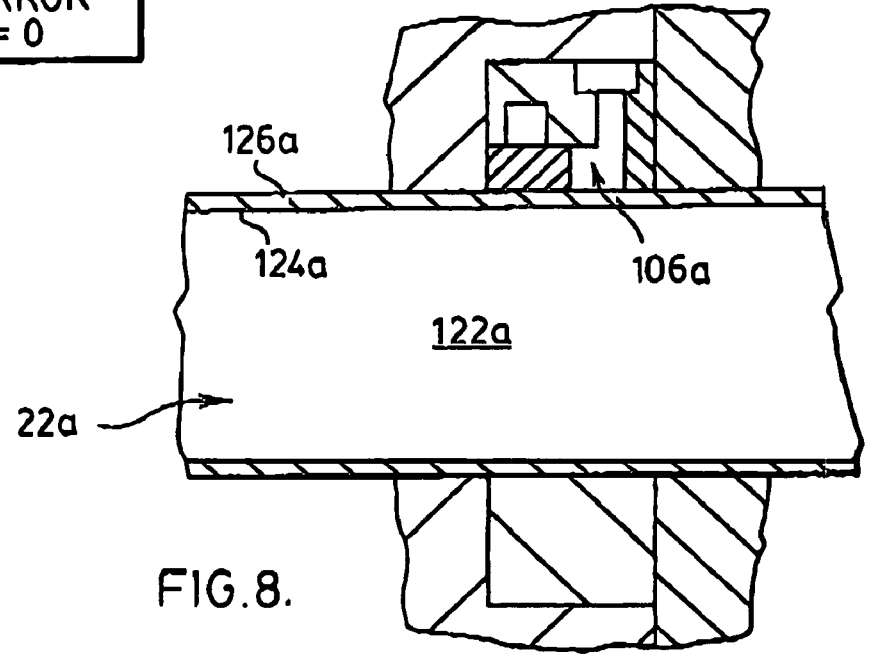
FIG. 8 is a sectional view similar to FIG. 3 of a further embodiment of cylinder.

A further embodiment is shown in FIG. 8 in which like reference numerals will be used with like components with a suffix "a" added for clarity. Referring to FIG. 8 therefore, the piston rod 22a has a core 122a formed with a tapered outer surface 124a. The taper of the surface 124$_a$ may be adjusted to suit particular applications but a taper of 0.10 in. in diameter on a 24 inch stroke has been found satisfactory. The core 122a is formed from a magnetically reactive material and a non-magnetic coating 126a applied to the surface 124a. The coating is typically chrome plating to provide a hardwearing outer surface and is ground to a cylindrical finish after coating. The outer surface 124a thus provides a magnetic to non-magnetic interface which varies in distance from the transducer along the length of the rod 22a. The transducer assemblies 106a, 108a, 110a are positioned to detect the varying magnetic signal as the rod moves relative to the cylinder assembly 12a and thereby provide a signal proportional to the position of the rod 22a. It will be noted that because of the tapered surface, a unique signal is provided for each position of the piston rod with a maximum at one end and a minimum at the other. This unique signal enables a single transducer to be utilised whilst giving the requisite resolution although multiple transducers may be used if preferred. The unique signal at each position of the rod permits the position of the rod to be determined even after an electrical power interruption which is particularly important in some applications.

To avoid ambiguity in the signal obtained from the transducer, a thermal compensation may be incorporated into the signal processing. Elongation of the rod due to elevated temperatures may lead to a different signal for a given position and this may then be compensated to maintain the desired accuracy. The unique value of the signal for each position permits the thermal compensation to be tailored to each position of the cylinder.

The invention claimed is:

1. An actuator having a cylinder and a piston assembly moveable within said cylinder, said piston assembly including a piston rod projecting from said cylinder and having a surface that presents to a predetermined location on said cylinder a varying discernible characteristic as said surface moves relative to said cylinder, and a sensor assembly to monitor said varying discernible characteristic and to measure changes therein to provide an indication of movement of said piston assembly relative to said cylinder, said varying discernible characteristic being provided by an interface on said piston assembly exhibiting a change in said discernible characteristic and defined by a helical groove having oppositely directed convergent flanks inclined to the direction of travel of the rod and defining a series of peaks, said sensor assembly including three transducers circumferentially spaced about said piston rod and positioned relative to one another such that when one of said transducers is aligned with one of said series of peaks, a pair of said transducers are aligned with respective ones of said convergent flanks, the distance between said interface and each of said transducers varying progressively and continuously as said piston assembly moves relative to said cylinder, said pair of transducers providing a pair of phase shifted signals as said piston moves past said sensor assembly, a function of said pair of phase shifted signals providing said indication of movement.

2. An actuator according to claim 1 wherein said discernible characteristic is magnetic permeability.

3. An actuator according to claim 1 wherein said predetermined location is positioned adjacent the exit of said piston assembly from said cylinder.

4. An actuator according to claim 1 wherein a signal from one of said transducers is correlated to predetermined signals from another of said transducers.

5. An actuator according to claim 4 wherein said signals are correlated to one another to provide verification of a signal obtained from one of said transducers by reference to another of said signals.

6. An actuator according to claim 1 wherein said groove is filled with a material different to that of said piston to provide a smooth outer surface.

7. An actuator according to claim 6 wherein said rod is supported in a bearing in said cylinder and a seal assembly encompasses said rod, said sensor assembly being located adjacent said bearing assembly.

8. An actuator according to claim 6 comprising a wear-resistant plating on said rod.

9. An actuator according to claim 1 wherein said helical groove is in the form of a screw thread having tips adjacent to said cylindrical outer surface, each of said transducers providing a peak signal upon a tip passing thereby.

10. An actuator according to claim 9 wherein the number of peak signals received from one or more of said transducers are monitored to provide an indication of movement of said rod relative to said cylinder.

11. An actuator according to claim 10 wherein identification of a peak signal is verified by correlation to signals from the others of said transducers.

12. An actuator according to claim 10 wherein peak signals are monitored from one of said three transducers when an error signal representing the difference between a desired position and an actual position is greater than a predetermined value and peak signals from all of said three transducers are monitored when said error signal is less than said predetermined value.

13. An actuator according to claim 1 wherein said discernible characteristic is magnetic permeability and said transducers comprise Hall effect sensors.

* * * * *